US009359005B2

(12) United States Patent
Doan et al.

(10) Patent No.: US 9,359,005 B2
(45) Date of Patent: Jun. 7, 2016

(54) DRIVE MECHANISM FOR AUTOMATED GUIDED VEHICLE

(75) Inventors: Paul George Doan, Macomb, MI (US); Dean Colwell, Lenox Township, MI (US); LiKe Xu, Rochester Hills, MI (US)

(73) Assignee: Fori Automation, Inc., Shelby Township, MI (US)

( * ) Notice: Subject to any disclaimer, the term of this patent is extended or adjusted under 35 U.S.C. 154(b) by 958 days.

(21) Appl. No.: 12/981,269

(22) Filed: Dec. 29, 2010

(65) Prior Publication Data

US 2012/0006609 A1    Jan. 12, 2012

Related U.S. Application Data

(60) Provisional application No. 61/290,730, filed on Dec. 29, 2009.

(51) Int. Cl.
*B62D 5/04* (2006.01)
*B62D 7/02* (2006.01)
*B60K 17/30* (2006.01)

(52) U.S. Cl.
CPC ............ *B62D 5/0418* (2013.01); *B60K 17/303* (2013.01); *B62D 7/023* (2013.01)

(58) Field of Classification Search
USPC .......... 180/6.2, 6.28, 6.44, 6.48, 6.5, 7.1, 7.2, 180/8.3, 23, 24.06, 24.07, 65.51, 199, 200, 180/202, 234, 237, 252, 253, 254, 255; 74/425
See application file for complete search history.

(56) References Cited

U.S. PATENT DOCUMENTS

| 4,519,466 | A  | * | 5/1985  | Shiraishi ........................ 180/7.1 |
| 4,616,730 | A  | * | 10/1986 | Strehler et al. ................ 180/253 |
| 4,733,737 | A  | * | 3/1988  | Falamak ........................ 180/7.1 |
| 6,491,127 | B1 | * | 12/2002 | Holmberg et al. ............ 180/252 |
| 7,296,643 | B2 | * | 11/2007 | Philipson ..................... 180/65.1 |
| 7,789,175 | B2 | * | 9/2010  | Tobey et al. ................. 180/65.1 |
| 2007/0256868 | A1 |   | 11/2007 | Romig |
| 2010/0181136 | A1 | * | 7/2010 | Swasey et al. ................ 180/253 |

FOREIGN PATENT DOCUMENTS

| JP | 10097321   | 4/1998 |
| JP | 10207547   | 8/1998 |
| JP | 2002211201 | 7/2002 |

OTHER PUBLICATIONS

International Search Report for PCT/US2010/062408, Aug. 19, 2011, 2 pages.

* cited by examiner

*Primary Examiner* — Joseph Rocca
*Assistant Examiner* — Marc A Scharich
(74) *Attorney, Agent, or Firm* — Reising Ethington P.C.

(57) ABSTRACT

A drive mechanism for an AGV that includes a drive unit for propelling the AGV and a steering unit for steering the AGV. The drive unit has a drive motor, drive transmission, and a drive wheel. The steering unit has a steering motor. Both motors are fixedly mounted on the AGV and remain stationary relative to each other while the drive motor rotates the drive wheel and the steering motor steers the drive wheel. The drive transmission couples the drive motor to the drive wheel and can be at least partially mounted within a gear housing that is rotatably mounted via a bearing so that the drive motor can be operated to move the AGV via power transferred to the drive wheel via the drive transmission, and the steering motor can be operated to steer the drive wheel by rotation of the gear housing and drive wheel via the bearing.

18 Claims, 5 Drawing Sheets

US 9,359,005 B2

DRIVE MECHANISM FOR AUTOMATED GUIDED VEHICLE

CROSS-REFERENCE TO RELATED APPLICATION

This application claims the benefit of U.S. Provisional Patent Application No. 61/290,730, filed Dec. 29, 2009, the entire contents of which are hereby incorporated by reference.

TECHNICAL FIELD

The present invention generally relates to automated guided vehicles (AGVs) and, more particularly, to drive mechanisms for propelling and/or steering AGVs.

BACKGROUND OF THE INVENTION

AGVs are commonly used in manufacturing facilities as one form of automation that helps in the efficient production and internal movement of equipment and machinery. The AGVs provide a transport that can be fully or partially automated to move equipment, workpieces, or inventory between locations within a facility. When used for manufacturing, an AGV can be used, for example, to move a workpiece or assembly between workstations or along a continuously moving assembly line. See, for example, U.S. Pat. No. 6,109,424. For automated movement, the AGV can be programmed with a predefined path, or can be programmed to follow a guided path, such as by sensing a wire or magnetic strip that is laid upon or embedded in the floor. Propulsion of the AGV can be by way of a drive motor. Movement of the AGV along a non-rectilinear path normally involves a steering mechanism having a separate steering motor that steers the vehicle wheel under program control. Where the steerable wheel is also driven to provide or assist propulsion of the AGV, the drive motor is typically mounted on the steerable wheel so that the steering motor turns both the wheel and its drive motor when steering the AGV.

SUMMARY OF THE INVENTION

In accordance with one embodiment, there is provided a drive mechanism for an automated guided vehicle (AGV). The drive mechanism includes a drive unit for propelling the AGV. The drive unit has a drive motor, a drive transmission, and a drive wheel that is operably coupled to the drive motor via the drive transmission. The drive wheel is steerable and the drive motor is mounted so that it remains stationary while the drive wheel is steered about a steering axis.

In accordance with another embodiment, there is provided a drive mechanism for an AGV that includes a drive unit for propelling the AGV and a steering unit for steering the AGV. The drive unit has a drive motor and a drive wheel and the steering unit has a steering motor. Both the drive motor and the steering motor remain stationary relative to each other while the drive motor rotates the drive wheel and the steering motor steers the drive wheel. In some embodiments, the drive mechanism can include a drive transmission that couples the drive motor to the drive wheel and that is at least partially mounted within a gear housing that is rotatably mounted on the drive unit via a bearing so that the drive motor can be operated to move the AGV via power transferred to the drive wheel via the drive transmission, and the steering motor can be operated to steer the drive wheel by rotation of the gear housing and drive wheel via the bearing.

In accordance with another embodiment, there is provided an AGV that includes a frame having two or more wheels that support and permit rolling movement of the AGV, with at least one of the wheels being a drive wheel that provides propulsion for the AGV. The AGV has a drive unit that includes the drive wheel, a drive motor, and a drive transmission, wherein the drive motor is operably coupled to the drive wheel via the drive transmission. The AGV also has a steering unit that includes a steering motor operably coupled to the drive wheel to steer the drive wheel about a steering axis. The drive motor is mounted independently of the drive wheel such that the drive wheel can be steered about the steering axis without the drive motor being rotated about the steering axis.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The drive mechanism described below may be used to drive and/or steer any type of automatic or automated guided vehicle (AGV). An AGV is typically an unmanned and self-propelled vehicle that travels around a guided path or route laid out on the floor of a factory, warehouse, distribution center, graded earth, etc. Some examples of potential AGV applications include handling materials, delivering parts in a warehouse, and advancing a workpiece or assembly through various stages of a manufacturing process, to cite a few. Skilled artisans will appreciate that there are a number of different types of AGVs, including those that use optical sensors, magnetic sensors, electric field sensors, global positioning system (GPS) sensors, inertial guidance means, and human control via a joystick or other control device to navigate the AGV along a guided path. The drive mechanism described below is not limited to any particular type of AGV and may be used with any of the previously mentioned examples, as well as any other type of AGV. Turning now to FIGS. 1A-1D, there are shown several exemplary AGVs 10-16 that may use the present drive mechanism. In each of the FIGS. 1A-1D, the underside of an exemplary AGV is shown in order to illustrate certain components and arrangements.

Figure 1A:
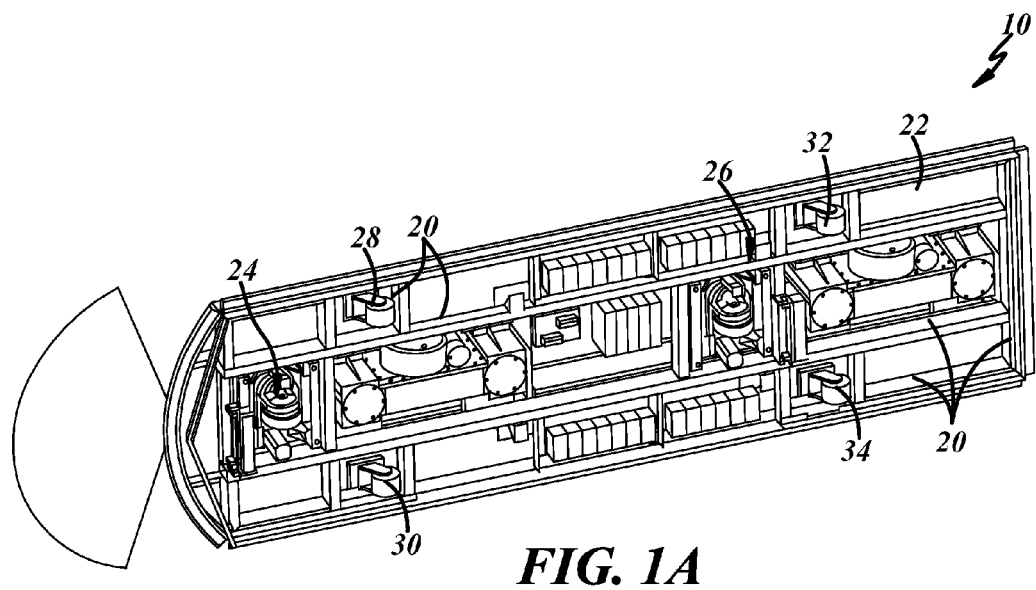
FIGS. 1A-1D are bottom isometric views of several exemplary automated guided vehicles (AGVs), wherein each of the exemplary AGVs may use the drive mechanism described herein.

FIG. 1A shows an exemplary AGV 10 that includes a frame 20, a platform 22, a pair of drive mechanisms 24, 26, and four wheels 28, 30, 32, 34. Of course, AGV 10 may also include other components—like sensors, electronic control units, battery packs, battery charging equipment, docking systems, part lifting mechanisms, etc. These other components can be constructed and assembled in ways known to those skilled in the art and are therefore not described further in detail. Frame 20 acts as a chassis or structural framework for AGV 10 and may be constructed according to any number of different arrangements and from a variety of materials. Platform 22 is securely fixed to frame 20 and is preferably designed to carry whatever load the AGV is designed to transport. In some cases, the AGV may be expected to transport very heavy objects or assemblies (e.g., portions of a car, truck, airplane, etc.); in such a case the frame 20 and/or the platform 22 may need to be reinforced. As the name suggests, drive mechanisms 24, 26 generally drive or propel the AGV as it makes its way along the guided path. It is possible for drive mechanism to only drive the AGV, to both drive and steer the AGV, or to perform some other combinations of tasks. A more detailed explanation of the drive mechanism will be provided below, but it should be appreciated that the number and position of drive mechanisms on the AGV may vary according to the particular needs of the application. For example, exemplary AGV 10 includes a first drive mechanism 24 towards the front of the vehicle and a second drive mechanism 26 towards the rear. In this particular embodiment, both the front and rear drive mechanisms 24, 26 are located near the widthwise center of AGV 10, but this is not necessary. Wheels 28-34 may be casters or any other suitable type of rotary object and can assist AGV 10 with smooth movement along the guided path.

Figure 1B:
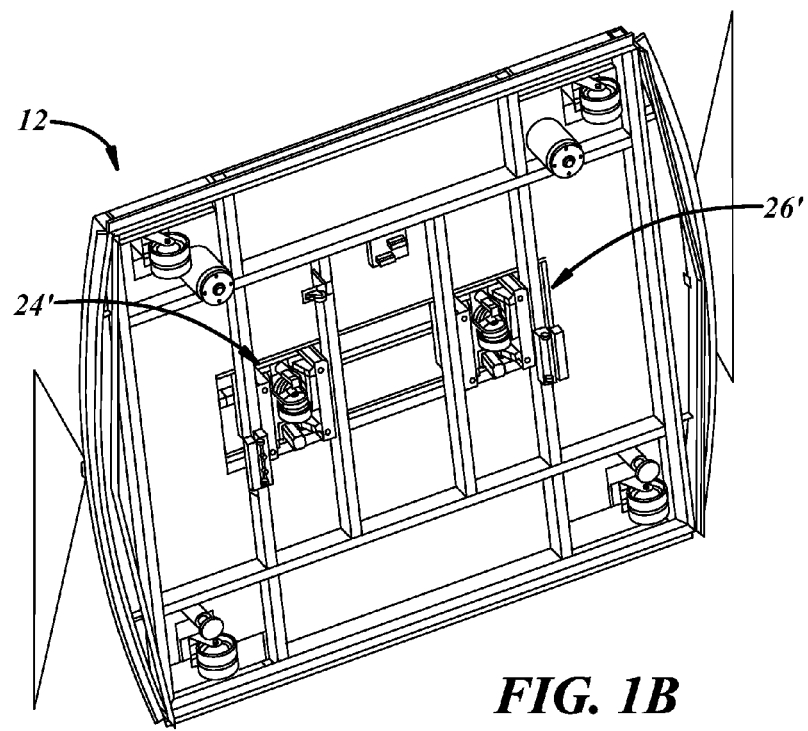
Figure 1C:
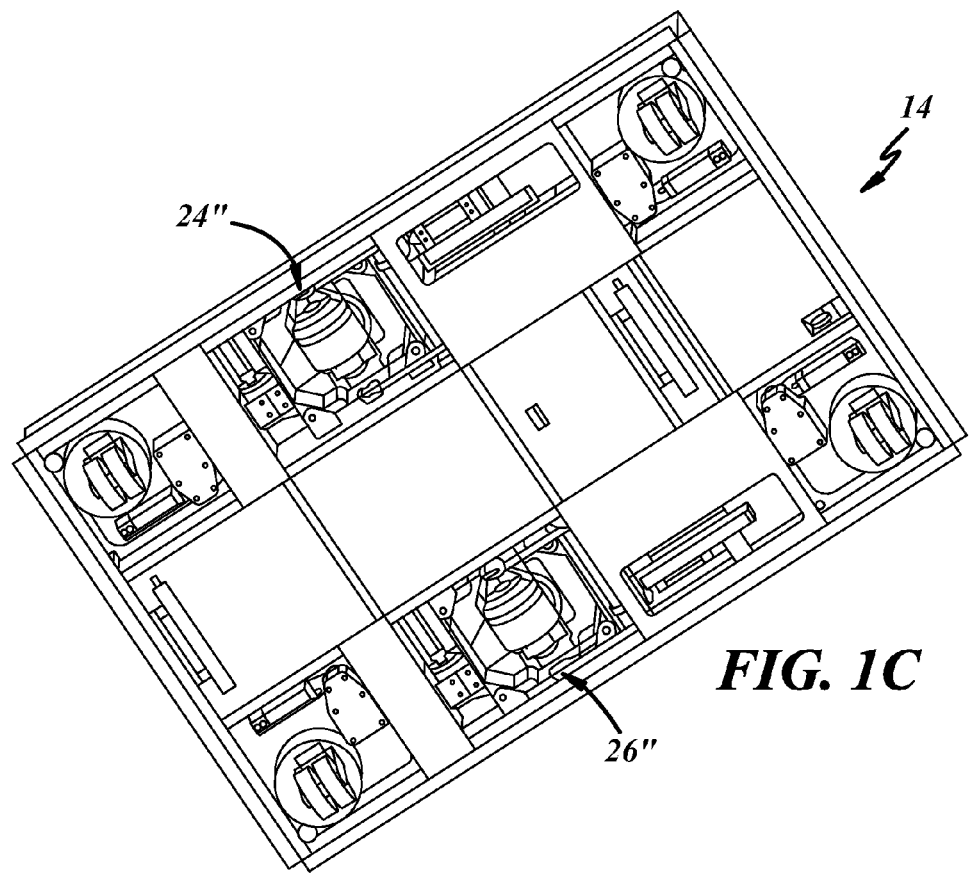
Figure 1D:
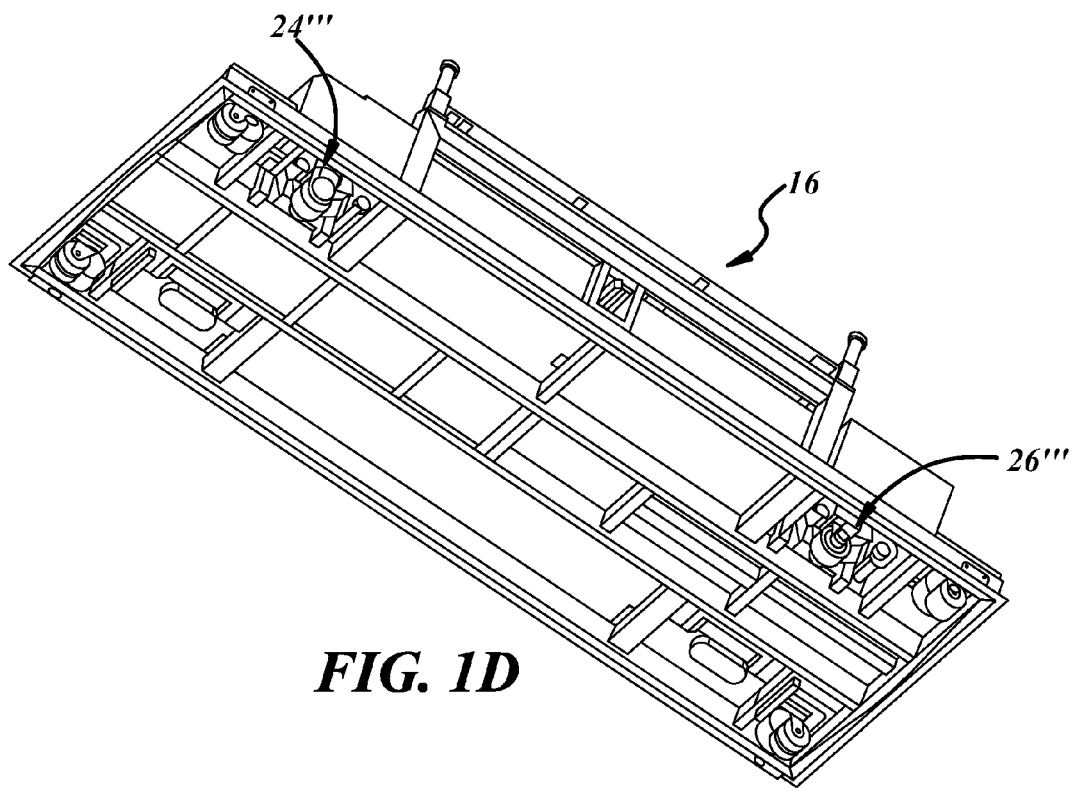

FIGS. 1B-1D show other exemplary AGVs that may use the drive mechanism described herein. According to the embodiment in FIG. 1B, the exemplary AGV 12 includes front and rear drive mechanisms 24', 26' that are mounted closer to one another than those of the previous embodiment. More specifically, drive mechanisms 24', 26' are fixed to the frame in an area of the AGV that is near both the widthwise and lengthwise center of the vehicle, as opposed to being near the front and rear of the vehicle, as is the case in FIG. 1A. In the exemplary embodiment of FIG. 1C, AGV 14 includes a pair of drive mechanisms 24", 26" that are mounted in a side-by-side fashion so that neither mechanism is forward or rearward of the other. Drive mechanisms 24", 26" are fixed to the frame of AGV 14 near the perimeter of the vehicle, as opposed to being mounted near the widthwise center of the vehicle. FIG. 1D shows yet another embodiment of an AGV that may use the present drive mechanism. According to the embodiment of FIG. 1D, an exemplary AGV 16 includes drive mechanisms 24''', 26''' that are located towards the front and the rear of the vehicle, respectively, but are mounted on a single side of the vehicle instead of being mounted near the widthwise center of the vehicle.

It should be appreciated that the preceding AGV examples only represent some of the potential embodiments in which the present drive mechanism may be used. Other AGVs may use the drive mechanism as well, including those having a different number of drive mechanisms (e.g., AGVs having one, three, four, five drive mechanisms, etc.) and those having drive mechanisms located at different positions on the AGV, to cite a few possibilities. The exact number, location and arrangement of the drive mechanisms may be dictated by the nature of the objects that the AGV is expected to transport, as well as the maneuvers or turns that the AGV must make in order to follow the intended route or guided path. For instance, an AGV may include a single drive mechanism that propels and/or steers the vehicle, it may include multiple drive mechanisms that propel and/or steer the vehicle, or it may include a first drive mechanism that both propels and steers the vehicle and a second drive mechanism that only propels the vehicle. The exemplary AGVs shown in FIGS. 1A-1D are simply provided to illustrate some of the potential applications for the drive mechanism described herein and are not meant to limit its application or use.

Figure 2:
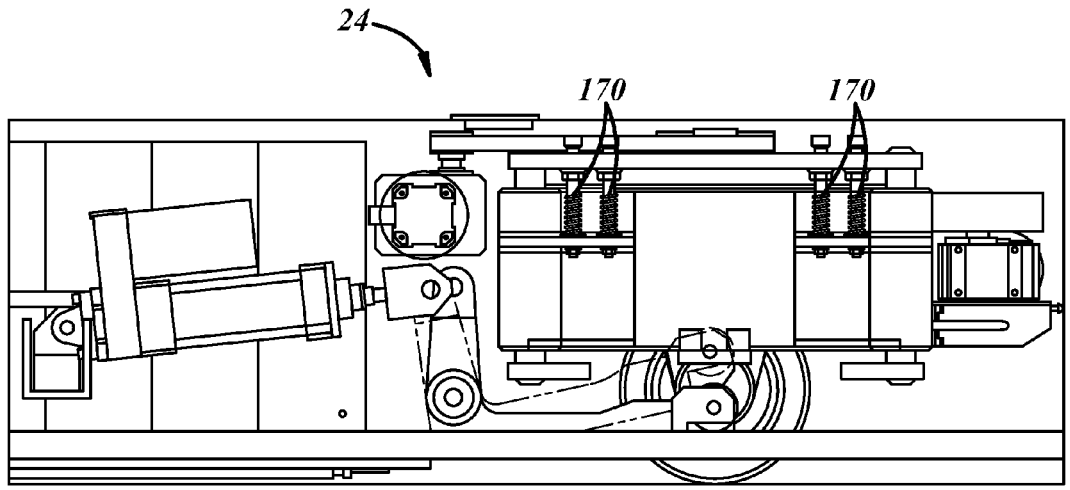
FIG. 2 is a side section view of one of the exemplary AGVs from FIGS. 1A-1D, wherein an exemplary drive mechanism is mounted within the AGV and has both drive and steering capabilities.

FIGS. 2-6 show several different perspectives of an exemplary drive mechanism 24 that may be used in any number of different AGVs, including the exemplary AGVs illustrated in FIGS. 1A-1D. More specifically, FIG. 2 shows a potential installation of the exemplary drive mechanism in an AGV (the AGV is shown with some additional components, such as a drive/steer retract mechanism, etc.), where FIGS. 3-6 show different features of the exemplary drive mechanism. According to this particular embodiment, drive mechanism 24 can both propel and steer the AGV and includes a drive unit 50, a steering unit 52, a gear housing 54, and a suspension system 56. It is not necessary that drive mechanism 24 include the steering unit and the suspension system, as some embodiments of the drive mechanism may only propel the AGV without steering it or acting as a suspension. Drive mechanism 24 may include one or more stationary motors (i.e., stationary relative to the AGV frame or body itself); this allows for a compact drive mechanism that can continuously turn 360° without electrical connections and cables getting tangled, kinked or otherwise fatigued. Other potential characteristics and traits of drive mechanism 24 are certainly possible and are illustrated in FIGS. 2-6.

Drive Unit—

Drive unit 50 propels the AGV and, according to this particular embodiment, includes a drive motor 60, a drive belt 62, a drive pulley 64, a drive transmission 66, and a drive wheel 68, all constructed and interconnected such that drive motor 60 is operably coupled to the drive wheel 68 via the belt 62, pulley 64, and transmission 66. Drive motor 60 is preferably an electric motor that is fixedly mounted to the AGV so that the drive motor can remain stationary while drive wheel 68 is rotated (steered) about a steering axis A. Unlike many AGV drive motors that turn or rotate with a steering unit, drive unit 50 remains stationary as the AGV is steered, thus, providing more operational freedom for the overall drive mechanism and reducing the amount cable fatigue that it experiences. According to the exemplary embodiment shown here, drive motor 60 is an electric servo motor (e.g., a 2.2 KWatt DC servo motor) that is mounted to a suspended plate 36 of the AGV in an off-to-the-side and vertical or upright position so that a motor shaft 80 generally extends in an upright orientation. The motor shaft 80 has a motor pulley 82 fixedly attached at its upper end for receiving drive belt 62, and the motor shaft and motor pulley rotate together so that they move the drive belt and ultimately power the entire drive unit 50. Depending on the electrical architecture of the AGV, drive motor 60, as well as other electrical components on the AGV, may run off of standard voltage buses (e.g., 12 VDC, 24 VDC, 48 VDC, etc.) or high voltage buses (e.g., 200V-300V). In another embodiment which is described later, drive motor 60 is fixedly mounted on top of drive shaft 90, instead of in the off-to-the-side position shown here. Such an arrangement still enables the drive motor to remain stationary while the AGV is steered, but does so according to a different arrangement. Other drive motor arrangements and installations are also possible.

In some conventional AGVs it is impractical to use a drive mechanism with a servo motor; this is particularly true for drive mechanisms where the electric motor is rotatably attached to the AGV so that the entire motor turns when the drive wheel is steered (as opposed to being fixedly attached to the AGV body like drive motor 60). By using a stationary servo motor, exemplary drive unit 50 may increase its range of rotary motion, decrease wear-and-tear on the drive mechanism (e.g., on cables and other connectors that would otherwise experience cable fatigue from constant flexing, bending, etc.), improve its efficiency (e.g., using servo motors which typically use the same amount of current across a wide RPM range), improve the closed-loop control of the motor (e.g., again using servo motors which may include incremental, absolute or other types of integrated encoders that provide accurate rotational position information), and provide better design flexibility (e.g., by allowing for industry standard servo motors that can be easily programmed with open architecture controls, as opposed to being limited to certain proprietary motor arrangements). It should be appreciated that the preceding attributes of drive motor 60 are only potential examples and that it is not necessary that a servo motor be used. For example, open loop brush or brushless DC motor arrangements may be used instead.

Drive belt 62 mechanically couples or transfers the output of drive motor 60 to drive pulley 64, and may be provided according to one of a number of different embodiments. In one example, drive belt 62 is a reinforced timing belt that is flat on an outer side, is toothed or ribbed on an inner side, and is made of a suitable material that keeps the drive belt taut between motor pulley 82 and the larger drive pulley 64. Belts can typically support higher RPMs than comparable chains, however, it is not necessary that a belt be used to couple motor pulley 82 and drive pulley 64 together. A chain or any other suitable connector may be used instead. In one exemplary application, drive belt 62 may accommodate up to about 4,000 RPM of drive motor output which can translate into an AGV ground speed of approximately 500-600 mm/sec. Of course, the performance attributes of drive unit 50 will be largely governed by the needs of the particular application in question and may differ significantly from that described here.

Drive pulley 64 is fixedly mounted on a drive shaft of drive transmission 66 and rotates under the power of drive motor 60. In one exemplary embodiment, drive pulley 64 is a timing pulley that is secured to a drive shaft via a keyed feature, compression coupling, taper-lock bushing or some other suitable component; this prevents the drive pulley from spinning on the drive shaft. The diameter of drive pulley 64—or more importantly the ratio of diameters between drive pulley 64 and motor pulley 82—will typically be driven by the particular needs and parameters of the AGV in which drive unit 50 is being used. In order to increase the torque provided by drive motor 60, a drive pulley 64 may be provided with a larger diameter than that of motor pulley 82. According to a non-limiting example, the ratio of the drive pulley diameter to the motor pulley diameter is from about 2:1 to 4:1, inclusive.

Drive transmission 66 mechanically couples or transfers the rotary motion of drive pulley 64 to drive wheel 68, and may be provided according to any number of different embodiments. According to the exemplary embodiment best shown in FIG. 4, drive transmission 66 includes a first drive shaft 90, several different gears 92, 94, 96, 98, 100, a second drive shaft 102, and planetary gears 104, 106, 108. Drive transmission 66 converts the rotary motion of the first drive shaft 90, which is generally vertically aligned, to rotary motion of the second drive shaft 102, which is generally horizontally aligned, and increases the torque as well. First drive shaft 90 is securely fastened to drive pulley 64 at an upper end and includes a gear 92 at a lower end that cooperates with gear 94. Rotation of first drive shaft 90 causes gear 94 to rotate, which may be an idler gear, which in turn rotatably drives gears 96 and 98. Gears 92, 94 and/or 96 may be spur gears or some other suitable gear, cog, etc. By using idler gear 94 in between, a gear ratio of about 2:1 to 4:1 for gears 92 and 96 may be achieved, for example. Gears 96 and 98 are both keyed or otherwise coupled to a vertical shaft so that rotation of upper gear 96 results in a corresponding rotation of lower gear 98, which is shown here as a beveled gear. Bevel gear 98 meshingly interacts with bevel gear 100, so that the rotational movement of gear 98 (which rotates around a vertical axis) is transferred to gear 100 (which rotates around a horizontal axis). A gear ratio of about 2:1 to 3:1 may be used for gears 98 and 100, for example. Second drive shaft 102 is fixed to gear 100 at one end and coupled to planetary gear 104 at the other. Thus, rotation of the second drive shaft 102 causes planetary gears 104, 106, 108 to move, which in turn rotates drive wheel 68. Planetary gear 104 includes a ring gear attached to drive wheel 68, a sun gear attached to second drive shaft 102, and several planet gears that rotate around the sun gear, as is understood by those skilled in the art. The exemplary drive transmission 66 that is shown and described herein may, for example, have an overall gear ratio from about 60:1 to 120:1 which increases the torque from drive motor 60 to drive wheel 68.

Figure 4:
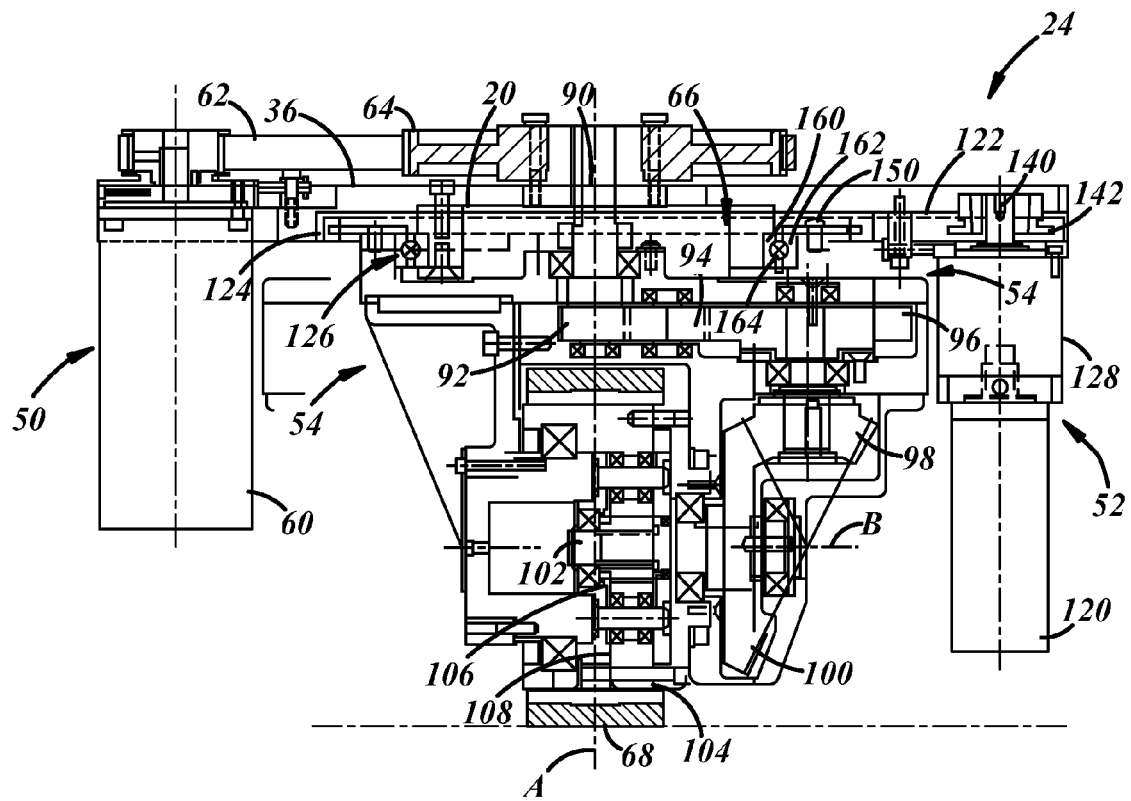
FIG. 4 is a side section view of the exemplary drive mechanism of FIG. 3.
Figure 5:
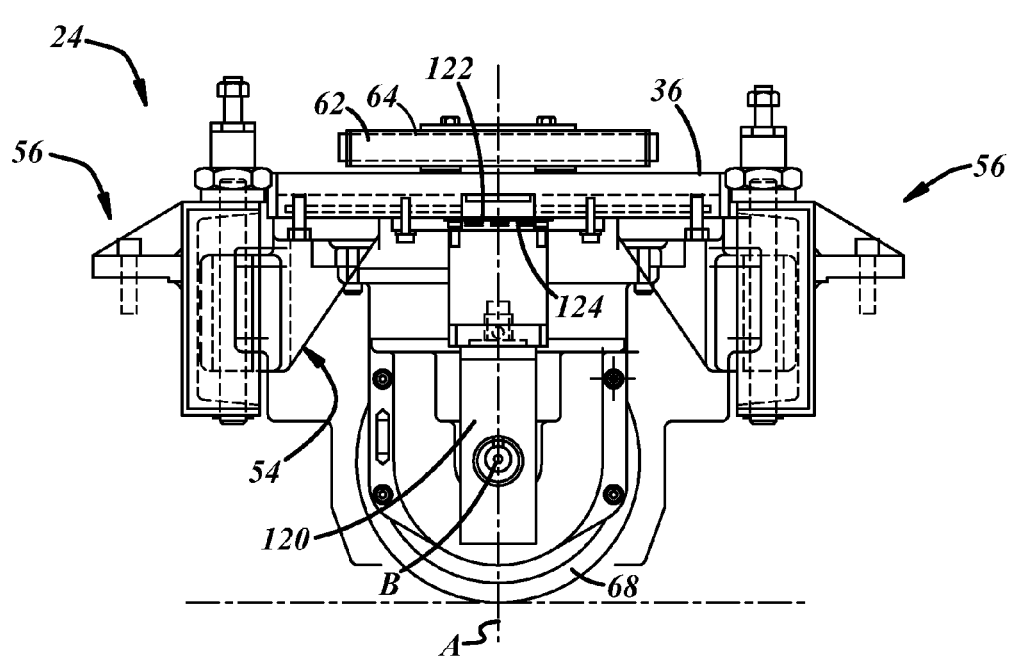
FIG. 5 is a side elevation view of the exemplary drive mechanism of FIG. 3.
Figure 6:
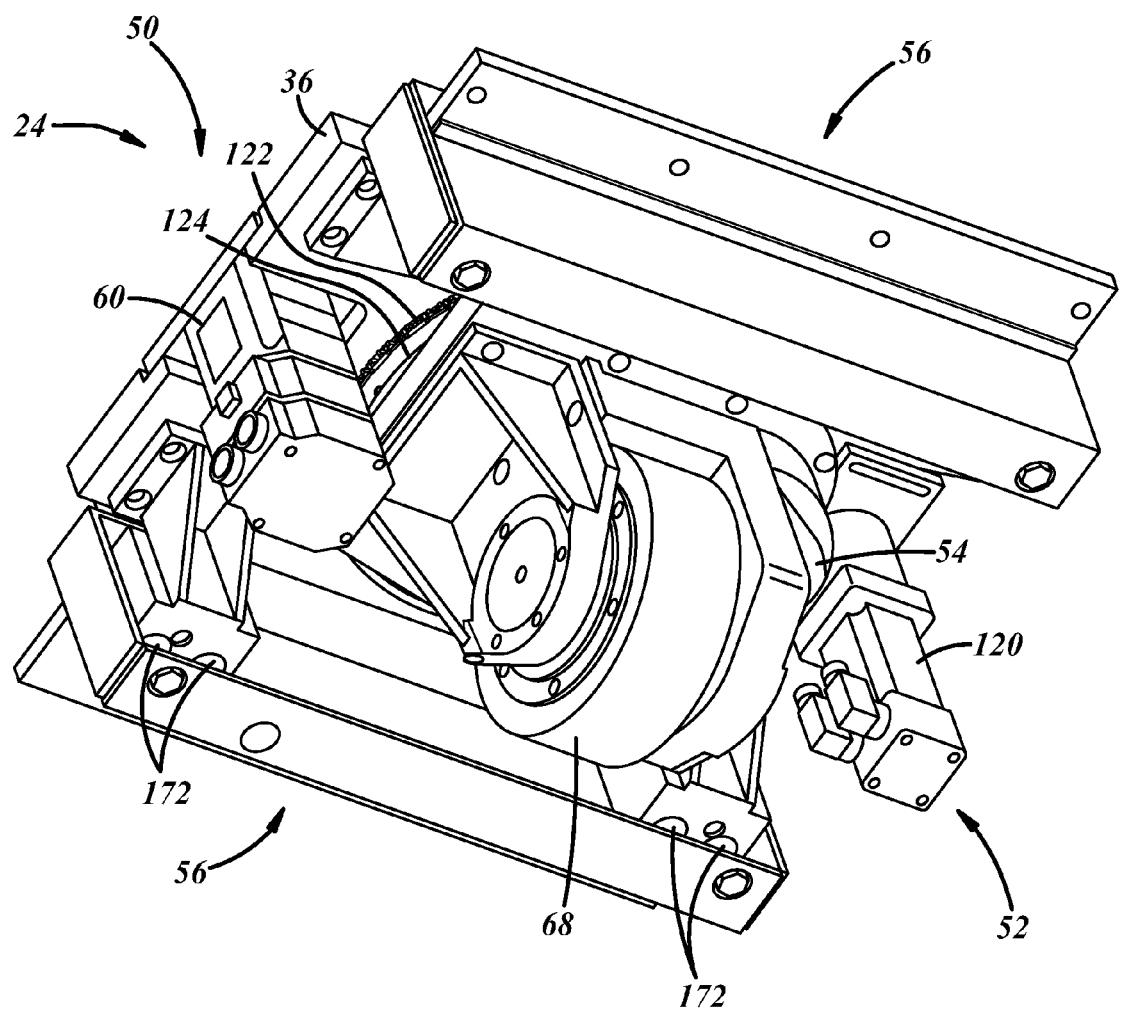
FIG. 6 is a bottom isometric view of the exemplary drive mechanism of FIG. 3.

It should be appreciated that the drive transmission embodiment that is shown in FIG. 4 and described above is only exemplary and that other drive transmissions may be used instead. Drive transmission 66 may include any combination of gears, wheels, cogs, shafts, pulleys, etc., so long as it is capable of coupling or transferring the output from drive motor 60 to drive wheel 68. In an alternative embodiment, drive transmission 66 has a different construction where drive motor 60 is fixedly mounted on top of drive shaft 90 (instead of being mounted off-to-the-side). So long as drive shaft 90 extends along steering axis A (the same axis that gear housing 54 rotates around), drive motor 60 can be fixedly mounted to the AGV such that it remains stationary during steering. In such an arrangement, drive motor 60 may be provided with or without an adjacent gear box; if the overall height of drive mechanism 24 is not too restrictive, then a gear box could be attached to drive motor 60 at the top of the mechanism and thereby eliminate the need for planetary gear 104. Of course, any number of other drive transmissions may be used, as the present drive mechanism is not limited to any specific one.

Drive wheel 68 contacts the floor surface in the factory, warehouse, distribution center, etc. where the AGV is to be used, and propels the AGV under the power of drive motor 60. The drive wheel is not limited to any one type of wheel or material, however, in one embodiment drive wheel 68 is made from a polyurethane material. Depending on the weight and nature of the cargo being transported by the AGV, it may be preferable to have two or more drive wheels mounted side-by-side or otherwise. Other embodiments are certainly possible.

Steering Unit—

Steering unit 52 steers or guides the AGV and, according to this particular embodiment, includes a steering motor 120, a steering chain 122, a steering sprocket 124, a bearing 126, and a gearbox 128. Steering motor 120 is preferably an electric motor that is fixedly mounted off-to-the-side of the steering unit—similar to drive motor 60—so that the steering motor generally does not turn or move when steering the AGV. Thus, both drive motor 60 and steering motor 120 remain stationary relative to each other during operation. According to the exemplary embodiment shown here, steering motor 120 is an electric servo motor (e.g., a 0.43 KWatt DC servo motor) that is mounted to the AGV in an upright or vertical position so that a gearbox shaft 140 generally extends in an upright orientation. The gearbox shaft 140 has a motor sprocket 142 fixedly attached at its upper end for receiving steering chain 122, and the motor shaft and motor sprocket rotate together so that they move the steering chain and ultimately turn the steering unit 52.

Steering chain 122 mechanically couples or transfers the output of steering motor 120 to steering sprocket 124, and may be provided according to one of a number of different embodiments. According to an exemplary embodiment, steering chain 122 is designed to fit around sprockets 124 and 142 and to do so in a way that maintains the chain in a taut condition during operation. Because steering motor 120 is not expected to produce as high of RPMs as drive motor 60, a chain will typically suffice as opposed to a belt. Also, the use of the chain and sprocket arrangement helps maintain the drive wheel 68 at the position set by drive motor 120, since the engagement of the sprocket teeth with the chain will prevent relative slippage between the output shaft of motor 120 and the housing 54 that supports drive wheel 68. In this way, the steered position of the drive wheel 68 (that is, the steering angle) is locked to the output shaft of the steering motor 120, whereby the steering motor 120 maintains the drive wheel 68 at the selected steered angle even when the motor is off. That is not to say that a belt or any other type of connector could not be used, as such components may be preferable in certain applications. In one exemplary application, steering chain 122 may accommodate up to about 60 RPM. Of course, the performance attributes of steering unit 52 will be largely governed by the needs of the particular application in question and may differ significantly from that described here. For example, rather than using a chain or belt, steering unit 52 could include its motor mounted directly above with its output shaft extending along steering axis A, or could be coupled via gears rather than the sprockets and chain arrangement shown. In another embodiment, the construction of FIG. 4 can be used, except that gearbox 128 may be omitted, as such a gearbox may not be necessary.

Figure 3:
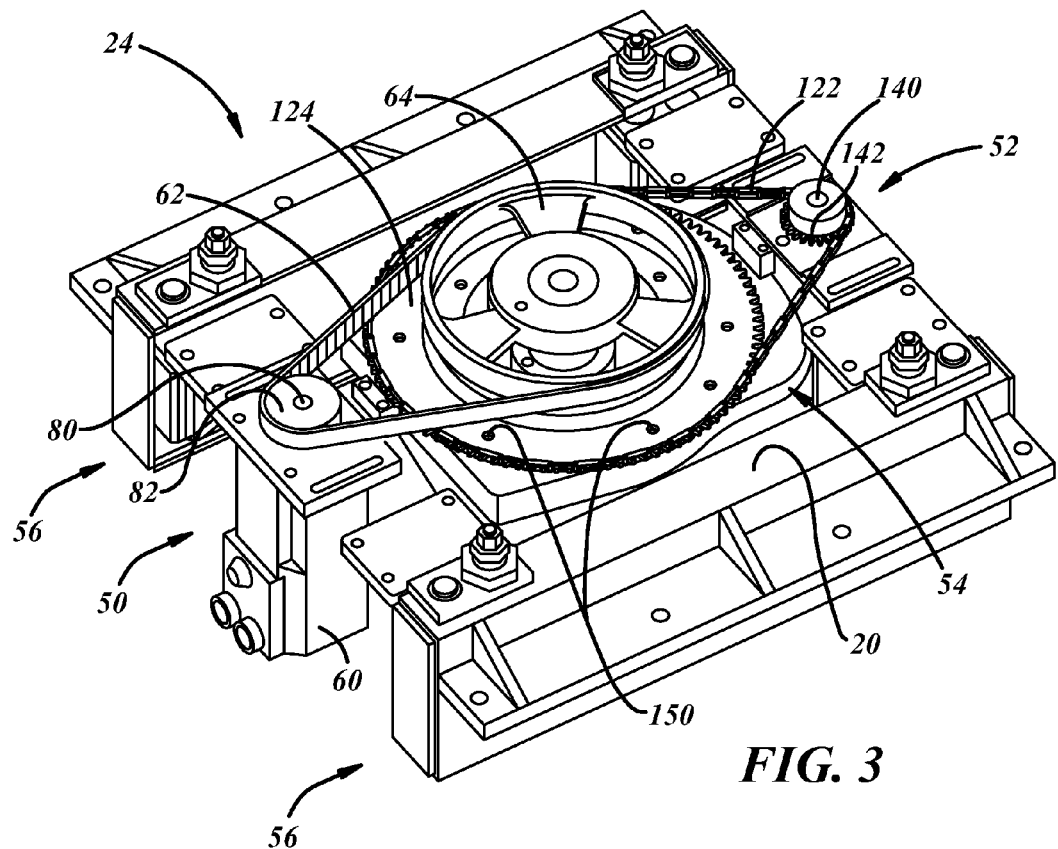
FIG. 3 is a top isometric view of the exemplary drive mechanism of FIG. 2, wherein some of the components from FIG. 2 have been removed for purposes of illustration.

Steering sprocket 124 is fixed or attached to gear housing 54 so that the sprocket, the gear housing, and ultimately the drive wheel 68 all rotate together under the power of steering motor 120, which remains stationary. As best illustrated in FIGS. 3 and 4, steering sprocket 124 is bolted to gear housing 54 via one or more bolts or other attachment means 150 and includes an opening in its center to allow first drive shaft 90 to pass through. During assembly, the steering sprocket 124 is bolted onto gear housing 54 in such a way that an outer race of bearing 126 is trapped therebetween; this prevents the steering sprocket and the entire gear housing (which houses drive transmission 66, drive wheel 68 and a number of other components) from simply falling off of the AGV. Other arrangements and constructions could be provided, as the specific steering sprocket shown here is merely exemplary.

Bearing 126 provides drive mechanism 24 with a rotatable junction or interface between the stationary components (like motors 60 and 120) and the rotatable components (like gear housing 54 and the entire drive transmission 66). Although a variety of different bearing types may be used, according to the exemplary embodiment shown here bearing 126 is a turn table bearing that includes an inner race 160, an outer race 162, a ring of ball bearings 164 located between the inner and outer races. Inner race 160 may be attached to the suspended plate 36, the frame, or some other part of the AGV and remains rotationally stationary during steering of the vehicle. Outer race 162, on the other hand, is attached to gear housing 54 and rotates with the gear housing and steering sprocket during steering of the vehicle. The ring of ball bearings 164 are aligned in a generally annular fashion around bearing 126 and act as a low friction junction between the inner and outer races. Skilled artisans will appreciate that any type of bearing or other component that provides a movable junction or interface may be used to rotatably couple the steering sprocket 124 and gear housing 54 to the frame of the AGV and that the present drive mechanism is not limited to the exemplary turn table bearing shown and described here. For example, the steering unit 52 could be designed such that the inner race of bearing 126 rotates while the outer race stays stationary.

In operation, drive mechanism 24 propels and steers the AGV and does so in a manner where both drive motor 60 and steering motor 120 remain stationary. Addressing first the drive or propulsion aspects of the mechanism, drive motor 60 turns motor pulley 82, which in turn moves drive belt 62 and drive pulley 64. The drive pulley 64 is attached to first drive shaft 90 such that rotation of the first drive shaft causes the various gears of drive transmission 66 to turn and eventually rotate drive wheel 68 with an increased amount of torque (this is due to the gear ratio discussed previously). At this point, if drive unit 50 is propelling the AGV but steering unit 52 is remaining inactive (i.e., the AGV is driving in a straight line), then there will be no rotation or pivoting of the gear housing 54 about steering axis A. Put differently, drive wheel 68 will be rotating around a drive axis B, but will not be turning about steering axis A. When steering unit 52 becomes active and goes to steer drive wheel 68, steering motor 120 turns motor sprocket 142, which in turn moves steering chain 122 and steering sprocket 124. The steering sprocket is bolted or otherwise attached to gear housing 54. Thus, the steering sprocket and the entire gear housing (which accommodates at least a portion of drive transmission 66) all rotate about steering axis A. This causes drive wheel 64 to turn and the AGV to be steered.

It should be appreciated that during both the propulsion and steering activities described above, neither the drive motor 60 nor the steering motor 120 turn. Both remain stationarily attached to the AGV. Although axis A is referred to as a "steering axis," it is not necessary for drive wheel 68 to turn about steering axis A under the power of an attached steering motor. For instance, drive mechanism 24 could provide only propulsion for the AGV while some other mechanism or unit steers the AGV. In such a case, drive wheel 68 could simply follow the turns or maneuvers of some other steering unit while it turns about steering axis A.

Suspension System—

Suspension system 56 is an optional feature that allows the AGV to compensate for uneven ground conditions and the like. According to an exemplary embodiment, suspension system 56 is an integrated and compact system that provides for one or more adjustments. The suspension system 56 may include a number of springs 170 that couple drive mechanism 24 to the rest of the AGV and are adjustable via spring assemblies 172 (best seen in FIG. 6). Again, the exemplary suspension system shown here is not necessary, as other suspension systems or no suspension systems at all may be used instead.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A drive mechanism for an automated guided vehicle (AGV), comprising:
    a drive unit for propelling the AGV and having a drive wheel, a drive transmission, and a drive motor that is operably coupled to the drive wheel via the drive transmission,
    wherein the drive transmission includes first and second drive shafts, a plurality of gears coupled between the first and second drive shafts to transfer drive power between the first and second drive shafts, and a planetary gear set located within the drive wheel to transmit drive power from the second drive shaft to the drive wheel,
    wherein the first drive shaft has an upper end and a lower end and the second drive shaft has an inner end and an outer end, the first drive shaft extending along a steering axis with the upper end coupled with the drive motor to receive drive power from the drive motor and the lower end coupled with the plurality of gears to provide the drive power to the plurality of gears, the second drive shaft extending along a drive axis of the drive wheel with the outer end coupled with the plurality of gears to receive the drive power from the plurality of gears and the inner end coupled to the planetary gear set to provide the drive power to the planetary gear set, and
    wherein the planetary gear set includes a ring gear attached to the drive wheel, a sun gear attached to the second drive shaft, and a plurality of planet gears that rotate around the sun gear and cooperate with both the ring and sun gears;
    wherein the drive wheel is steerable and the drive motor is mounted so that it remains stationary while the drive wheel is steered about the steering axis.

2. A drive mechanism as defined in claim 1, further comprising a steering unit that includes a steering motor coupled to the drive wheel to rotate it about the steering axis, wherein the drive and steering motors are fixedly mounted so that they remain stationary relative to each other during operation of the drive and steering motors.

3. A drive mechanism as defined in claim 2, wherein rotational output power from each of the drive and steering motors is transferred along the steering axis to the drive wheel.

4. A drive mechanism as defined in claim 3, further comprising a gear housing that houses at least a portion of the drive transmission, wherein the gear housing is rotatable by the steering motor about the steering axis.

5. A drive mechanism as defined in claim 4, wherein the steering motor is coupled to the gear housing via a bearing that supports the gear housing and drive wheel.

6. A drive mechanism as defined in claim 2, wherein the steering motor is coupled to the drive wheel such that the drive wheel can be maintained at a selected steering angle by the steering motor.

7. A drive mechanism as defined in claim 6, wherein the steering motor is coupled to the drive wheel via a chain and a sprocket mounted for rotation about the steering axis, whereby the chain and sprocket prevent relative slippage between the steering motor and drive wheel.

8. A drive mechanism as defined in claim 7, wherein the drive motor is coupled to the drive transmission via a drive belt and a pulley mounted for rotation about the steering axis.

9. A drive mechanism as defined in claim 1, wherein the drive transmission further includes drive transmission components that couple the drive power from the drive motor to the first drive shaft, and wherein the drive motor is mounted beneath at least one of the drive transmission components.

10. An automated guided vehicle (AGV), comprising:
    a frame and two or more wheels that support and permit rolling movement of the AGV; and
    the drive mechanism of claim 1, wherein the two or more wheels includes the drive wheel of the drive mechanism.

11. A drive mechanism for an automated guided vehicle (AGV), comprising:
    a drive unit for propelling the AGV and having a drive motor, a drive wheel, and a drive transmission having drive transmission components that together couple power from the drive motor to the drive wheel via the drive transmission components, wherein the drive motor is located beneath at least one of the drive transmission components; and
    a steering unit for steering the AGV and having a steering motor and steering transmission components coupled between the steering motor and drive wheel to transmit power from the steering motor to the drive wheel via the steering transmission components, wherein the steering motor is located beneath at least one of the steering transmission components;
    wherein both the drive motor and the steering motor remain stationary relative to each other while the drive motor rotates the drive wheel to move the AGV and the steering motor steers the drive wheel; and
    wherein the drive transmission components include a vertical shaft that is offset from and rotates about a steering axis of the drive wheel.

12. A drive mechanism as defined in claim 11, wherein power from the drive and steering motors are provided to the drive wheel at least partially along a common axis.

13. A drive mechanism as defined in claim 11, wherein the drive transmission rotates about an axis along with the drive wheel under power from the steering motor.

14. An automated guided vehicle (AGV), comprising:
    a frame and two or more wheels that support and permit rolling movement of the AGV; and
    the drive mechanism of claim 11, wherein the two or more wheels includes the drive wheel of the drive mechanism.

15. A drive mechanism as defined in claim 11, further comprising a gear housing for accommodating at least a portion of the drive transmission, the gear housing being rotatable about a steering axis of the drive wheel.

16. A drive mechanism as defined in claim 11, wherein the drive transmission comprises a planetary gear set located within the drive wheel.

17. A drive mechanism for an automated guided vehicle (AGV), comprising:
    a drive unit for propelling the AGV and having a drive motor, a drive transmission, and a drive wheel, wherein the drive transmission includes drive transmission components that together transmit drive power from the drive motor to the drive wheel;

a steering unit for steering the AGV and having a steering motor and a bearing; and a gear housing for accommodating at least a portion of the drive transmission;

wherein the drive and steering motors are fixedly mounted relative to each other beneath one or more of the drive transmission components and the gear housing is mounted via the bearing for rotation about a steering axis of the drive wheel so that both the drive motor and the steering motor can remain stationary while the drive motor propels the drive wheel via the drive transmission and the steering motor steers the drive wheel; and wherein the drive transmission comprises a planetary gear set located within the drive wheel.

18. An automated guided vehicle (AGV), comprising:

a frame and two or more wheels that support and permit rolling movement of the AGV; and the drive mechanism of claim 17, wherein the two or more wheels includes the drive wheel of the drive mechanism.

* * * * *